United States Patent
West et al.

(10) Patent No.: US 8,065,050 B2
(45) Date of Patent: Nov. 22, 2011

(54) METHOD AND APPARATUS FOR DETECTING AN INSUFFICIENT PHASE CURRENT IN A PERMANENT MAGNET SYNCHRONOUS MOTOR

(75) Inventors: Stephen T. West, New Palestine, IN (US); Wei D. Wang, Troy, MI (US); Sean E. Gleason, West Bloomfield, MI (US)

(73) Assignee: GM Global Technology Operations LLC, Detroit, MI (US)

(*) Notice: Subject to any disclaimer, the term of this patent is extended or adjusted under 35 U.S.C. 154(b) by 880 days.

(21) Appl. No.: 12/109,457

(22) Filed: Apr. 25, 2008

(65) Prior Publication Data

US 2009/0271060 A1 Oct. 29, 2009

(51) Int. Cl.
*G01M 17/00* (2006.01)
*G06F 7/02* (2006.01)

(52) U.S. Cl. ............ 701/31; 701/22; 324/146; 324/205; 324/76.52; 324/76.77; 324/143; 318/85; 318/490; 318/400.15; 318/768

(58) Field of Classification Search ............... 701/30, 701/29, 31, 22; 324/772, 389, 402, 205, 324/76.11, 76.12, 76.13, 76.16, 76.17, 76.19, 324/76.52, 76.77, 85, 143, 144, 146, 151 R, 324/154 R, 546, 545, 765.01; 180/65.265; 327/2, 3, 7, 100, 104, 236; 318/689, 690, 318/34, 41, 43, 52, 85, 437, 440, 441, 490, 318/543, 400.15, 400.02, 801, 768, 811
See application file for complete search history.

(56) References Cited

U.S. PATENT DOCUMENTS

| | | | | |
|---|---|---|---|---|
| 5,519,300 A * | 5/1996 | Leon et al. | ..................... | 318/729 |
| 5,902,342 A * | 5/1999 | Mishra | ............................. | 701/22 |
| 7,433,767 B2 * | 10/2008 | Takeuchi et al. | ................ | 701/41 |
| 7,694,763 B2 * | 4/2010 | Sugai et al. | ................ | 180/65.26 |
| 7,911,162 B2 * | 3/2011 | Hanada | ......................... | 318/139 |
| 2004/0210356 A1 * | 10/2004 | Wilton et al. | .................... | 701/22 |
| 2004/0222779 A1 * | 11/2004 | Cock et al. | ................. | 324/76.77 |
| 2007/0126385 A1 * | 6/2007 | Egami et al. | ..................... | 318/432 |
| 2009/0025992 A1 * | 1/2009 | Hayashi et al. | ........... | 180/65.265 |
| 2009/0051311 A1 * | 2/2009 | Lu et al. | ......................... | 318/806 |
| 2009/0066281 A1 * | 3/2009 | West et al. | ..................... | 318/434 |
| 2009/0159350 A1 * | 6/2009 | Hanada et al. | ........... | 180/65.265 |
| 2010/0004808 A1 * | 1/2010 | Tang et al. | ....................... | 701/22 |
| 2010/0100263 A1 * | 4/2010 | Aoki et al. | ....................... | 701/22 |
| 2010/0133025 A1 * | 6/2010 | Flett | ............................. | 180/65.22 |

* cited by examiner

*Primary Examiner* — Eric Culbreth
*Assistant Examiner* — Karen A Beck
(74) *Attorney, Agent, or Firm* — Quinn Law Group, PLLC

(57) ABSTRACT

A method is provided for detecting an insufficient or missing phase current in a permanent magnet synchronous motor, and includes determining a composite vector position of a combined three-phase phase current with respect to a stationary portion of the motor, and assigning a sector to the position. The method includes comparing the phase current to a calibrated threshold current corresponding to the sector, and executing a response when the absolute value is less than the threshold. A vehicle includes an energy storage device (ESD), a motor/generator configured as a permanent magnet synchronous motor, a voltage inverter, and a bus for conducting DC current from the ESD to the inverter. A controller detects an insufficient phase current, determines a current vector position of the three-phase AC, assigns a sector to the position, and executes a response when an absolute value of the phase current is less than a calibrated threshold.

13 Claims, 2 Drawing Sheets

METHOD AND APPARATUS FOR DETECTING AN INSUFFICIENT PHASE CURRENT IN A PERMANENT MAGNET SYNCHRONOUS MOTOR

TECHNICAL FIELD

The present invention relates a method and a system for dynamically detecting a missing or insufficient phase current in a permanent magnet synchronous motor.

BACKGROUND OF THE INVENTION

In a three-phase electric induction motor, an electrical current conducted through windings of a stationary portion of the motor produce a changing magnetic field, with the changing magnetic field in turn causing the rotor to rotate. In a permanent magnet synchronous motor, permanent magnets are attached to different portions of the rotor. An application of a three-phase alternating current (AC) voltage to the stator windings induces a changing magnetic field around the rotor, with the force of the opposing magnetic field of the permanent magnets causing the rotor shaft to rotate. Torque provided by a rotating shaft then can be harnessed and directed as needed for performing useful mechanical work within a system, for example by selectively connecting the rotor shaft to a transmission output shaft of a vehicle.

In a hybrid vehicle transmission in particular, one or two electric motor/generators can be used alone or selectively in conjunction with an internal combustion engine, a fuel cell, or other energy source in order to propel the vehicle. Such electric motor/generators are typically powered by a relatively high level of AC voltage. To ensure proper operation of the motor/generators, as well as to optimize fuel economy of the vehicle, a motor controller is provided which can perform various measurements and/or diagnostics of the electrical and mechanical systems aboard the vehicle. However, typical motor control methods may be less than optimal for detecting certain performance issues that are unique to multi-phase AC motors, such as a permanent magnet synchronous motor.

SUMMARY OF THE INVENTION

Accordingly, a method is provided for dynamically detecting an insufficient or missing phase current in a three-phase permanent magnet synchronous motor, such as can be used for selectively propelling a hybrid vehicle. As will be understood by those of ordinary skill in the art, an insufficient or missing AC phase current can be caused by, for example, a motor malfunction caused by a gradual degradation or deterioration of the insulating material encapsulating the wires of the motor coils or windings, as well as by improper or incomplete assembly and/or installation of the motor. The method helps ensure the normal operation of the motor while also ensuring that proper corrective action can be taken once an insufficient or missing phase current is detected, thus helping to reduce servicing or maintenance time and/or warranty costs.

In particular, the method includes measuring a phase current within the motor when at least one predetermined motor condition is present, and then determining an electrical current vector position, i.e., a composite rotating current vector in the motor for the combined phases of AC current, with respect to a stationary portion or frame of reference within the motor, such as a stator frame. A sector number is assigned to the vector position, and an absolute value of the phase current is compared to a calibrated threshold corresponding to the sector number. The method then includes executing a response, such as generating an appropriate message, activating an indicator device, and/or setting a fault code or vehicle diagnostic code, and may include transmitting information to a remote location using a vehicle telematics unit, when the absolute value of the phase current for the sector is less than the calibrated threshold current.

A vehicle is also provided having a direct current (DC) energy storage device (ESD), one or more three-phase AC motor/generators operable for propelling the vehicle, a DC-to-AC voltage inverter, and a voltage bus for conducting a DC current from the ESD to the inverter. The vehicle includes a controller having an algorithm for detecting an insufficient or a missing phase current within the motor/generator, with the controller measuring an AC phase current, and then determining a composite vector position with respect to a stationary portion or frame of reference of the motor/generator. The controller then executes a maintenance response or responses when an absolute value of the measured phase current is less than a calibrated threshold phase current.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
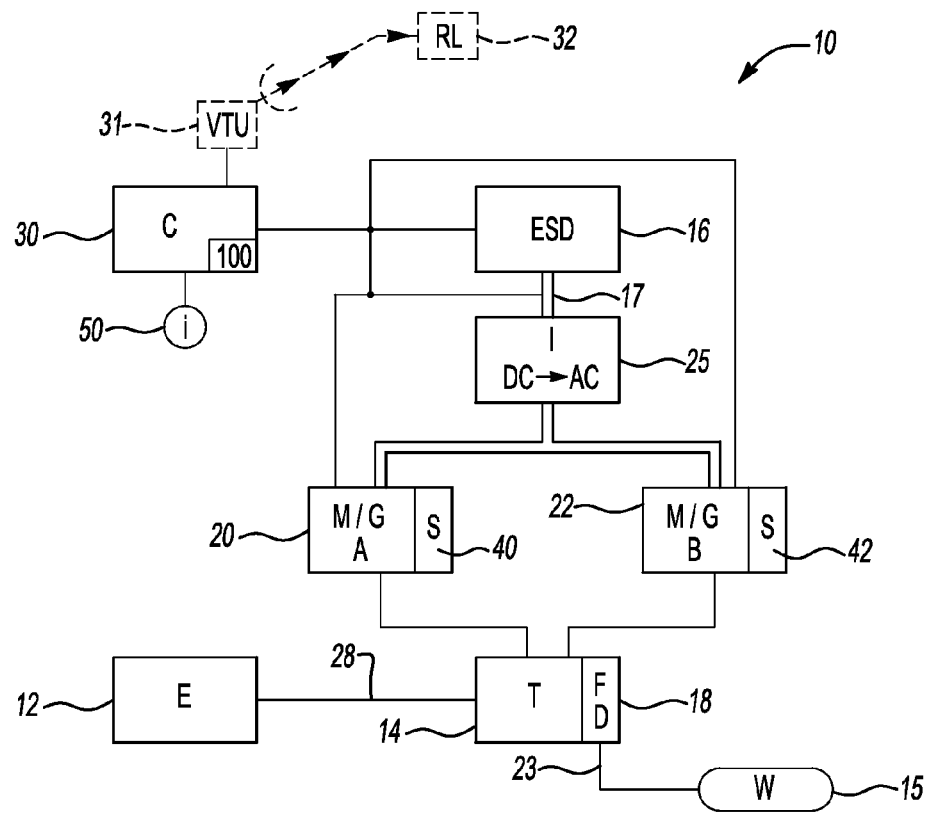
FIG. 1 is a schematic illustration of a vehicle having a three-phase motor and a controller in accordance with the invention.

Referring to the drawings wherein like reference numbers correspond to like or similar components throughout the several figures, and beginning with FIG. 1, a vehicle 10 includes a controller 30 having a method or algorithm 100 for detecting an insufficient or missing phase current in a three-phase AC electrical motor, such as the motor/generators 20 and 22, and for generating a suitable response when such a condition is determined, as will be described below with reference to FIG. 2. The vehicle 10 as shown in FIG. 1 is configured as a hybrid vehicle, and includes an engine (E) 12 having an output member that serves as an input member 28 to a transmission (T) 14.

The vehicle 10 also includes an electrical storage device (ESD) 16 and one or more motor/generators 20, 22 (M/G A and M/G B, respectively) that are each selectively connectable alone or in combination to the transmission (T) 14. A final drive assembly (FD) 18 is operatively connected to an output shaft or drive axle 23 and a set of drive wheels (W) 15 for propelling the vehicle 10. However, other power sources may also be used to propel the vehicle 10 within the scope of the invention, such as a fuel cell (not shown), or the vehicle 10 may be propelled exclusively via the electrical storage device (ESD) 16, which can be configured as a battery or other suitable electrical or electro-chemical device, and the motor/generators 20, 22 if the vehicle 10 is configured as a purely electric vehicle (PEV).

In the hybrid vehicle embodiment of FIG. 1, the ESD 16 is electrically connected to the motor/generators 20, 22 via a high-voltage DC bus 17 and a DC-to-AC inverter (I) 25 of the type known in the art. When operating in their capacities as electric motors, each of the motor/generators 20 and 22 can draw electrical energy from the ESD 16, and likewise when operating as generators, each can generate electrical energy to the ESD 16 for storage therewithin. Each of the motor/generators 20, 22 has a respective stator frame 40, 42, each also labeled S in FIG. 1 for clarity. As will be understood by those of ordinary skill in the art, the frames 40, 42 are considered for the purposes of the algorithm 100 to be stationary members or otherwise usable in determining a current vector position of each phase of an AC current therewithin.

Within the scope of the invention, each of the motor/generators 20, 22 is configured as a three-phase alternating current (AC) motor device, such as a permanent magnet synchronous motor of the type known in the art. As will be understood by those of ordinary skill in the art, in a three-phase electrical current energizing an AC motor device, each of the three phase currents can be carefully measured, detected, or otherwise determined individually using known sensors, and thus continuously monitored, by a properly configured controller such as the controller 30, as determined by the algorithm 100 resident within or accessible by the controller 30. The controller 30 is adapted for executing one or more responses to any detected insufficient or missing phase current. For example, a fault code or a vehicle diagnostic code can be generated and stored within the controller for access by a maintenance technician, a remote source, or a user of the vehicle 10. The vehicle 10 can also be equipped with a vehicle telematics unit (VTU) 31 of the type known in the art, which can transmit the generated diagnostic code or another message to a remote location (RL) 32 to facilitate remote diagnosis or corrective action determination. Or, the controller 30 can activate an indicator device (i) 50, such as a warning lamp and/or audio alarm, within the vehicle 10. Other responses can be envisioned within the scope of the invention.

Figure 2:
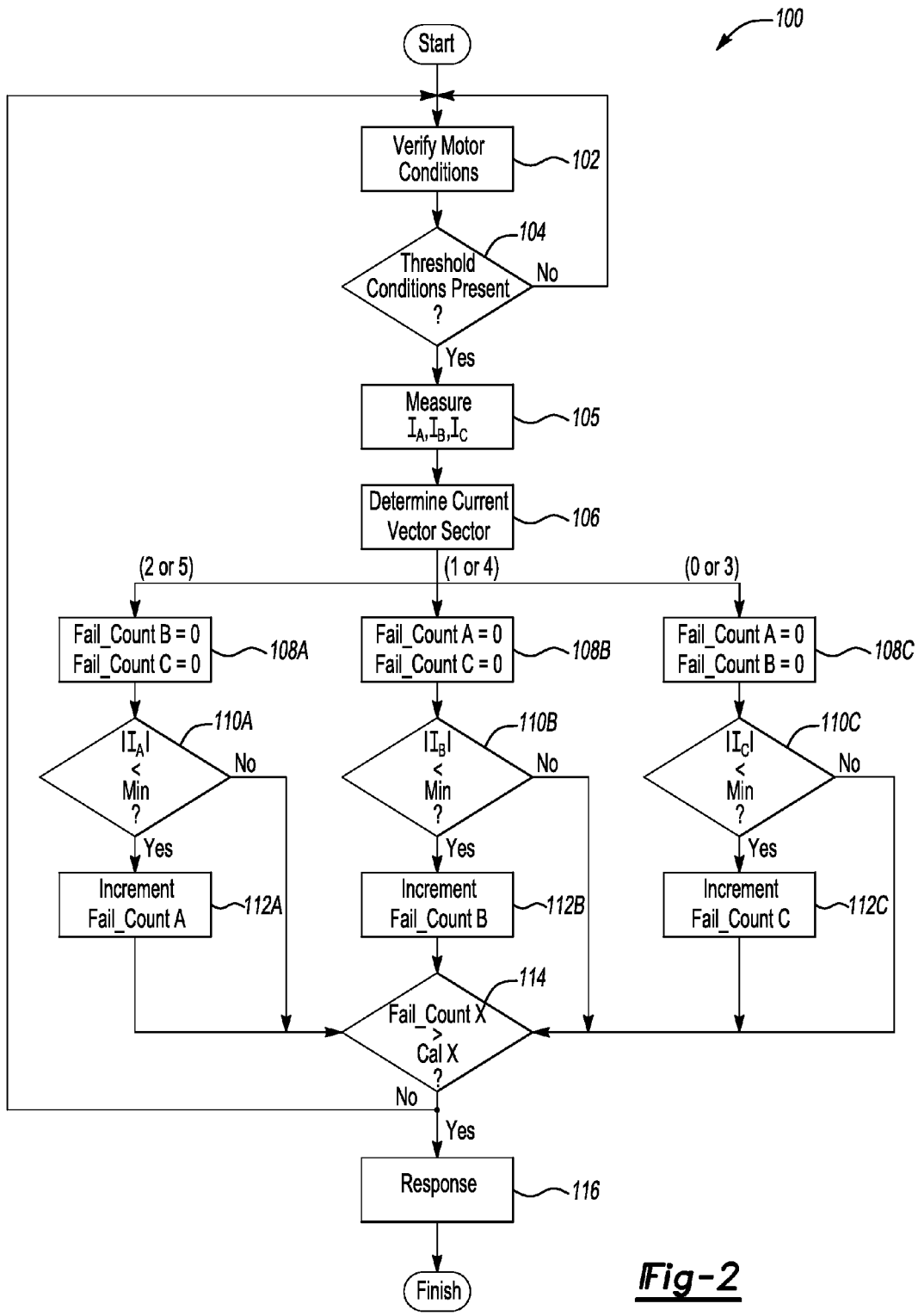
FIG. 2 is a flow chart describing a method or algorithm for detecting a missing or insufficient phase current in the three-phase motor of FIG. 1.

Referring to FIG. 2, the algorithm 100 of FIG. 1 is shown in more detail, and begins with step 102. At step 102, various motor control parameters, values, or conditions are measured or otherwise verified or determined. For example, the motor conditions can include an expected motor control state, such as a normal run state indicating an active torque command from the controller 30. The motor conditions can also include a DC bus voltage as measured or detected at the DC bus 17 (see FIG. 1), as well as other motor control signals or parameters.

Typical motor control parameters usable by the algorithm 100 can include the $i_d$ and $i_q$ commands, i.e., the respective measurable values of commanded flux current ($i_d$) and torque current ($i_q$) within the motor/generator 20, 22, as those terms will be understood by those of ordinary skill in the art of electric motor control. That is, in a known d-q axis model, a d-axis is aligned with the flux linkage vector of the permanent magnet of the motor/generator 20, 22, while a q-axis aligned orthogonally with a resulting back-EMF vector. Once step 102 is complete, the algorithm 100 proceeds to step 104.

At step 104, the algorithm 100 compares each of the motor conditions determined at step 102 to the expected or threshold values, and then continues with the algorithm 100 by proceeding to step 105 only if all of the expected or threshold values have been reached, properly verified, or exceeded. In this manner, step 104 ensures that the controller 30, which may be configured a single unit or combined with a separate hybrid transmission controller (not shown), has passed all of its basic circuit diagnostics, and is actively commanding torque from the particular motor/generator being diagnosed. That is, steady and sufficiently large three-phase AC currents should be readily detectable within the motor/generator 20, 22. Once step 104 is complete and all threshold conditions are present, the algorithm 100 proceeds to step 105.

At step 105, the algorithm 100 measures each phase A, B, and C of a combined three-phase current, and temporarily records the values within the controller 18 (see FIG. 1) or another readily accessible memory location. After measuring these values, the algorithm 100 proceeds to step 106.

Figure 3:
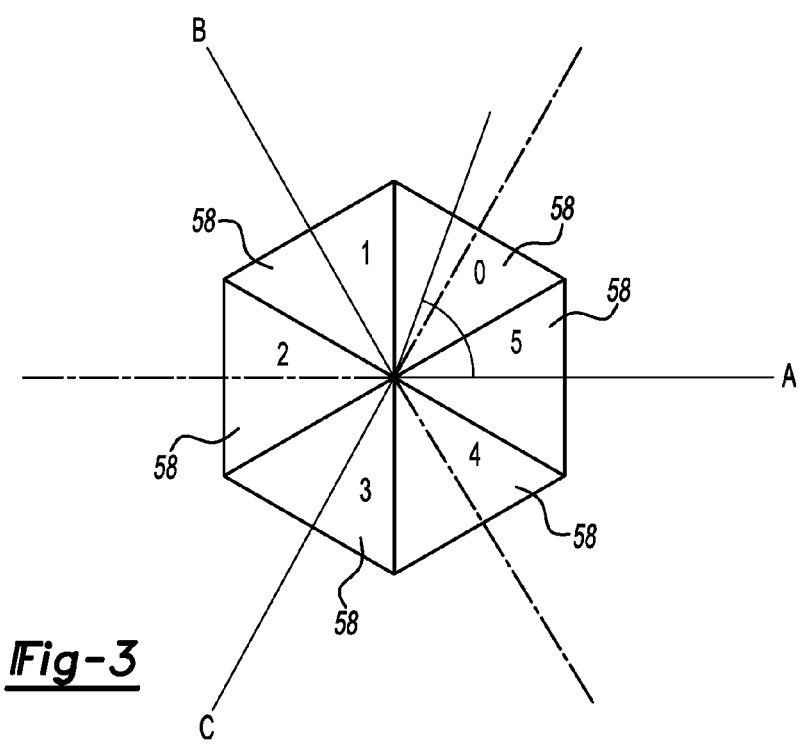
FIG. 3 is a schematic illustration of various sector designations for use with the method of FIG. 2.

At step 106, the algorithm 100 determines the position of a rotating composite vector which mathematically represents a combination of the three-phase current measured at step 105, and a corresponding sector for the composite vector based on a rotor position in the motor/generator 20, 22. As will be understood by those of ordinary skill in the art, a three-phase current is not effectively measurable as a combined current, and therefore each phase of the current is individually measured at step 105 as explained above in order to determine an effective "combined" phase current for the purpose of determining the composite vector position. The composite vector represents the joint or combined effect of the three phases. Such a composite vector can be placed within a corresponding sector as demarked with respect to a stationary portion of motor/generator 20, 22, such as the stator frames 40, 42 (see FIG. 1). The term "sector" as used herein refers to the position of the composite vector within +/−30 degrees along the respective +/−phase current axes for each of the A, B, and C phases, as shown in FIG. 3. As will be understood by those of ordinary skill in the art, the angle of a composite vector in an ABC phase diagram can be determined by adding the current command angle and a detected rotor position angle.

Referring briefly to FIG. 3, in each of the sectors 58 of the intersecting A, B, and C phase axes are assigned an integer number between 0 and 5. If the sector of the composite vector falls within sectors 2 or 5, the algorithm 100 proceeds to step 108A, indicating a first or "A" phase of the three-phase AC waveform. If the sector is 1 or 4, the algorithm 100 proceeds to step 108B, indicating a second or "B" phase of the three-phase AC waveform. If the sector is 0 or 3, the algorithm 100 proceeds to step 108C, indicating a third or "C" phase of the three-phase AC waveform.

Referring again to FIG. 2, at steps 108A, 108B, and 108C, a counter value, labeled FAIL_COUNT X in FIG. 2 for phases A, B, and C, respectively, is initialized by setting to zero corresponding counter values for the other two phases. For example, at step 108A, corresponding to the A phase, the counter values for phases B and C are set to zero, for step 108B (B phase) the counter values for phases A and C are set to zero, and for step 108C (C phase) the counter values for phases A and B are set to zero. The algorithm 100 then proceeds to steps 110A, 10B, and 110C, depending on the phase.

At steps 110A, 110B, and 110C, the absolute value of the measured phase currents (see step 105) are compared to a corresponding stored threshold value, which is a calibrated minimum acceptable current value for the phase being measured. If the absolute value of any of the of the measured individual phase currents is less than the corresponding threshold, the algorithm 100 proceeds to steps 112A, 112B, or 112C, depending on the phase. Otherwise, the algorithm 100 proceeds to step 114.

At steps 112A, 112B, and 112C, the algorithm 100 increments the counter corresponding to the phase being diagnosed. For example, at step 112A, which corresponds to phase A, a counter for phase A such as FAIL_COUNT_A is incremented. The algorithm 100 then proceeds to step 114.

At step 114, the value of the counter is compared to a calibrated threshold count or number. If the value of the counter exceeds the threshold number, the algorithm 100 proceeds to step 116, otherwise returning to step 102.

At step 116, having determined at step 114 that the counter value exceeds a predetermined threshold count or number, the algorithm 100 executes one or more responses. Such responses can include, without being limited to, setting a fault code within an accessible portion of the controller 30 (see FIG. 1) indicating a missing phase current, illuminating an indicator lamp within the vehicle 10, generating and/or transmitting a message either into the vehicle interior or remotely, or another suitable maintenance, diagnostic, or informational response.

While the best modes for carrying out the invention have been described in detail, those familiar with the art to which this invention relates will recognize various alternative designs and embodiments for practicing the invention within the scope of the appended claims.

The invention claimed is:

1. A method for detecting an insufficient phase current in a motor powered by a three-phase alternating current (AC), the method comprising:
    determining a plurality of motor control parameters, including a commanded flux current and a commanded torque current;
    measuring an individual phase current for each phase of the three-phase AC within the motor only when each of the plurality of motor control parameters exceeds a corresponding threshold to thereby determine that a sufficiently large torque command has been issued to the motor;
    calculating a combined phase current using each of the measured individual phase currents;
    determining a composite vector position for the combined phase current with respect to a stationary frame of reference of the motor;
    assigning a sector number to the composite vector position, wherein the sector number defines a position of the composite vector within +/−30 degrees along three respective current axes for each of the three phases of the three-phase AC;
    comparing an absolute value of each of the individual phase currents to a corresponding calibrated threshold current corresponding to the sector number which is assigned; and
    executing at least one response when the absolute value of at least one of the individual phase currents is less than the corresponding calibrated threshold current.

2. The method of claim 1, wherein the plurality of predetermined motor conditions includes a predetermined motor control state, a threshold voltage, and a threshold motor control signal value.

3. The method of claim 1, wherein executing at least one response includes at least one of setting a diagnostic code, generating a message, and activating an indicator device.

4. The method of claim 1, wherein determining a current composite vector position is determined with respect to a stator frame of the motor.

5. The method of claim 1, further comprising:
    incrementing an integer counter when the absolute value of any one of the phase currents is less than the threshold value; and
    executing the at least one response when the counter value exceeds a threshold counter number.

6. A method for detecting an insufficient phase current in a three-phase AC permanent magnet synchronous motor of a hybrid vehicle, the method comprising:
    detecting a predetermined motor control state;
    determining a commanded torque current;
    comparing at least the commanded torque current to a corresponding threshold value;
    measuring an individual phase current for each phase of the three-phase AC within the motor only when the predetermined motor control state is detected and the commanded torque current exceeds the corresponding threshold value;
    calculating a combined phase current using the measured phase currents for each phase;
    determining a composite vector position of the combined phase current with respect to a stationary frame of reference of the motor;
    assigning one of six different sector numbers to the composite vector position, wherein the sector numbers each describe a different location within the stationary frame of reference;
    comparing an absolute value of each of the individual phase currents to a corresponding calibrated threshold for the sector number; and
    executing at least one maintenance response when the absolute value of any one of the individual phase currents for the assigned sector number is less than the corresponding calibrated threshold current.

7. The method of claim 6, further comprising comparing measured flux current to a corresponding flux current threshold, and measuring the individual phase current for each phase only when the commanded torque current and the flux current both exceed the respective thresholds.

8. The method of claim 7, further comprising measuring a DC bus voltage, comparing the measured DC bus voltage to a corresponding DC bus voltage threshold, and measuring the individual phase current for each phase only when the commanded torque current, the flux current, and the DC bus voltage all exceed the respective thresholds.

9. The method of claim 6, wherein assigning one of six different sector numbers includes assigning an integer value between 0 and 5.

10. The method of claim 6, wherein executing at least one maintenance response includes one of storing a vehicle diagnostic code within a controller and transmitting the diagnostic code to a remote location to thereby facilitate maintenance of the vehicle.

11. A vehicle comprising:
    an energy storage device (ESD);
    at least one motor/generator operable for propelling the vehicle, the at least one motor/generator being configured as a permanent magnet synchronous motor which is energizable using a three-phase alternating current (AC);
    a DC-to-AC voltage inverter;
    a DC bus for conducting a DC current from the ESD to the inverter; and
    a controller configured for detecting an insufficient phase current in the at least one motor/generator;
    wherein the controller is configured for:
        measuring an individual phase current for each phase of the three-phase AC;
        for assigning a sector number to a composite vector position of the three-phase AC with respect to a stationary frame of reference of the motor/generator, wherein the sector number defines a position of the composite vector within +/−30 degrees along three respective current axes for each of the three phases of the three-phase AC; and for executing at least one vehicle maintenance response when an absolute value of any one of the individual phase currents is less than a corresponding calibrated threshold phase current for the assigned sector number.

12. The vehicle of claim 11, wherein executing the at least one vehicle maintenance response includes generating a diagnostic code via the controller.

13. The vehicle of claim 11, wherein the stationary frame of reference is a stator frame of the at least one motor/generator.

* * * * *